United States Patent [19]

Tremblay

[11] Patent Number: 4,891,859
[45] Date of Patent: Jan. 9, 1990

[54] ENGINE OIL DIP STICK INDICATOR WIPER

[76] Inventor: Napoléon Tremblay, 7620 Marie-Victorin Blvd., Brossard, Canada, J4W 1B2

[21] Appl. No.: 284,295

[22] Filed: Dec. 14, 1988

[51] Int. Cl.$^4$ ............................................. G01F 15/12
[52] U.S. Cl. ................................. 15/210 B; 15/104.8; 15/236.09
[58] Field of Search .............. 15/210 B, 104.8, 236.09, 15/104.92

[56] References Cited

U.S. PATENT DOCUMENTS

| | | |
|---|---|---|
| 1,747,100 | 2/1930 | Ashworth . |
| 1,909,834 | 5/1933 | Juliar . |
| 2,259,898 | 10/1941 | Lescher . |
| 2,634,445 | 4/1953 | Clark . |
| 2,739,338 | 3/1956 | Weeks . |
| 2,866,217 | 12/1958 | Dean . |
| 2,883,693 | 4/1959 | Leathers et al. . |
| 3,094,730 | 6/1963 | Schwarz . |
| 3,616,265 | 10/1971 | Calabrese . |
| 4,017,935 | 4/1977 | Hernandez .................. 15/104.92 |
| 4,233,704 | 11/1980 | Sartorio . |
| 4,245,367 | 1/1981 | Stoute . |
| 4,374,445 | 2/1983 | Wilson . |
| 4,380,841 | 4/1983 | Thomas . |
| 4,422,204 | 12/1983 | Long, Jr. . |
| 4,506,402 | 3/1985 | Long, Jr. . |

FOREIGN PATENT DOCUMENTS

| | | | |
|---|---|---|---|
| 310006 | 4/1931 | Canada . | |
| 516187 | 9/1955 | Canada . | |
| 520210 | 1/1956 | Canada . | |
| 532689 | 11/1956 | Canada . | |
| 836207 | 3/1970 | Canada . | |
| 1079825 | 12/1954 | France ............................. | 15/210 B |
| 689384 | 3/1953 | United Kingdom ............. | 15/210 B |
| 771402 | 4/1957 | United Kingdom ............. | 15/210 B |

Primary Examiner—Chris K. Moore

[57] ABSTRACT

A wiper system for use in removing the oil film deposited on an automobile engine dip stick. The small wiper system comprises a rigid frame adapted to be anchored to the engine compartment and having a vertical channel made thicknesswisely thereof. Two pairs of vertically spaced, semiflexible flaps are edgewisely mounted at their inner ends to the opposite side walls of the vertical channel, and are pivotable as if swingable doors. The flaps of each pair of flaps are slightly vertically offset. When a dip stick engages the channel of the wiper system, the free end sections of the flaps will wipe the surface of the dip stick, in order to remove the oil film deposited thereon.

7 Claims, 1 Drawing Sheet

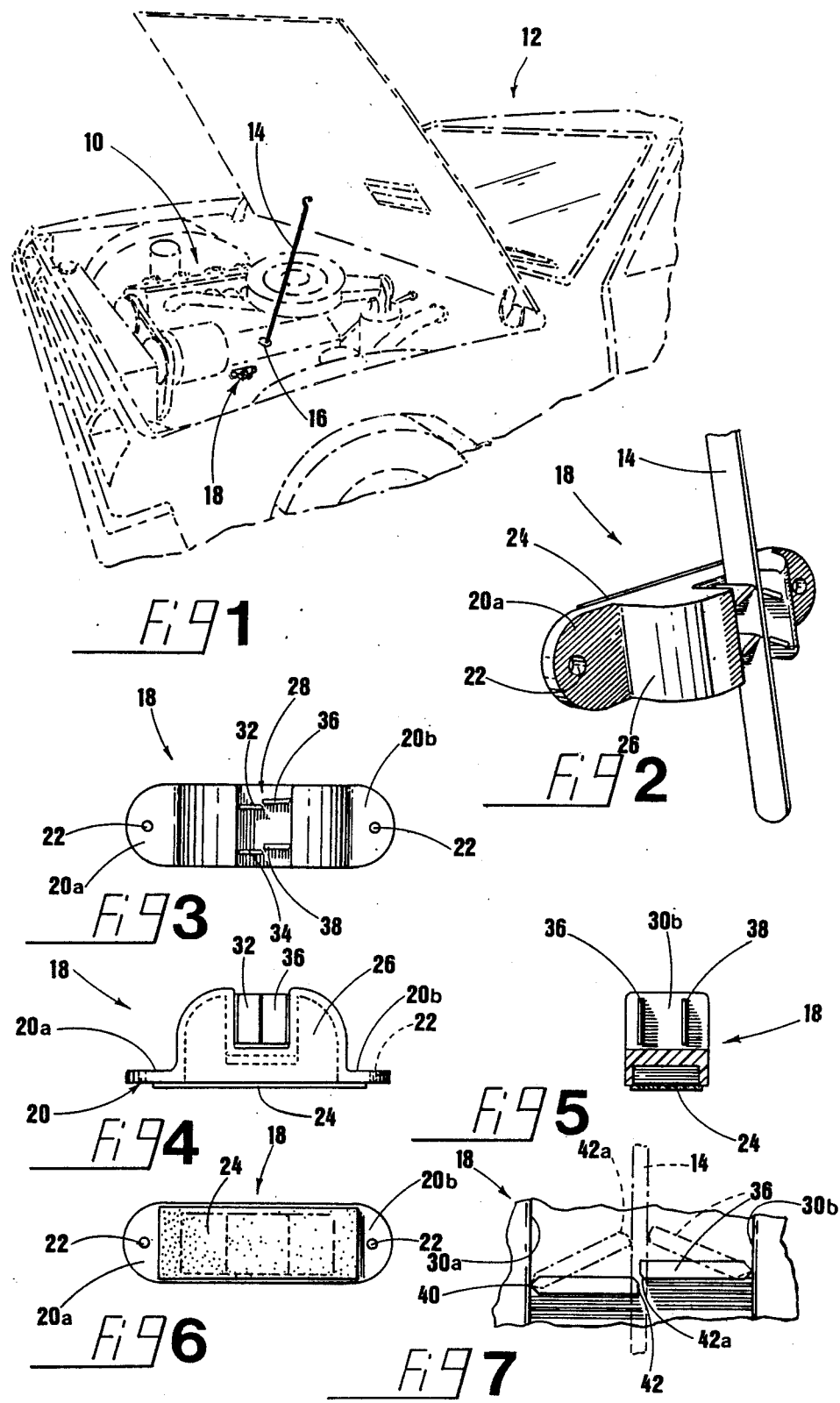

ENGINE OIL DIP STICK INDICATOR WIPER

FIELD OF THE INVENTION

This invention relates to automobile accessories.

BACKGROUND OF THE INVENTION

One of the critical requirements for smooth operation of a motor engine vehicle is the regular monitoring of oil levels. Indeed, oil lubricates the displacement of pistons in the cylinders of the engine, and should there be a shortage of oil, the piston would "grip" wherein the motor engine would rapidly become damaged usually beyond repair. There does exist dial displays for oil levels on the dash of automobiles. However, the data of such dials cannot be relied upon in an absolute sense wherein direct visual inspection is usually preferred.

Usual direct inspection of oil levels is made by effecting the following steps:

(a) open the hood of the car;
(b) seize and pull out the elongated dip stick from the crankcase upright tubular extension;
(c) wipe the calibrated end of the dip stick from all oil film deposit, e.g. with a fabric cloth;
(d) engage the dip stick into said tubular extension down to its lower limit position;
(e) again, withdraw the dip stick from the oil tank tubular extension;
(f) by direct visual inspection determine where the free end of the oil film on the dip stick registers with the scale of the calibrated end of the dip stick, e.g. a "full" level, a "safe" level, or an "add" level.

It is step (c) which renders this operation messy, in that the hands of the mechanic will often become contaminated with the oil, via diffusion of the oil through the fabric cloth used to wipe the dip stick.

It has been attempted in the past to improve the convenience of such step (c), in a variety of fashions. U.S. Pat. No. 4.017,935 issued in 1977 in the name of Reginaldo A. Hernandez, is a typical example of such improvement. With this patented dip stick cleaner, the dip stick can be inserted down through a slot made in a cleaner frame comprised of a resilient H-shaped flap (numeral 18 at FIGS. 1-3) so that the dip stick itself is within the dip stick tube, and as it is withdrawn from the dip stick tube, oil on the surface of the dip stick will be removed by the flaps contacting the dip stick. The free end edges of the flaps directly engage each other, in their unbiased position. These flaps are flexible, yet they exactly register with each other in their normal unbiased position: such construction has been empirically found to be inefficient by the present inventor.

OBJECTS OF THE INVENTION

The object of the invention is to substantially increase the convenience in the operation of de visu verification the oil level of a motor engine.

SUMMARY OF THE INVENTION

In accordance with the objects of the invention, there is disclosed a wiper member for use in removing a liquid film deposited on a dip stick, comprising: a small, rigid, relatively thick frame adapted to be anchored to a support, a cavity being made thicknesswisely of said frame along a vertical axis to define a vertical channel, said cavity being bounded by two side walls and by an inner wall of the wiper member frame wherein said dip stick is engageable through said channel and slidingly abuttable against said inner wall, at least one pair of semiflexible flaps, edgewisely mounted at their inner ends to said opposite side walls respectively, said flaps being freely maintained in a position orthogonal to said side walls and to said inner wall, pivot means about said inner ends of the flaps to enable said flaps to pivot about horizontal axes thereabout when a transverse biasing force is applied thereto, there being no free horizontal interface between said flaps in their freely maintained position; the free end sections of said flaps being adapted to wipe the surface of said dip stick during said channel sliding engagement, in order to remove a liquid film deposited thereon.

Preferably, the length of each of said flaps is about half that of said channel inner wall, wherein the free ends thereof come in vertical register.

Most preferably, said pair of flaps are slightly vertically offset, whereby the lower face of the upper flap is coplanar wth the upper face of the lower flap of each one of at least one pair of flaps.

Profitably, for each pair of said at least one pair of flaps, the lower corner of said free end section of said upper flap is bevelled and the upper corner of said free end section of said lower flap is also bevelled, to facilitate sliding displacement of said dip stick through said channel.

It would be desirable to have two pairs of identical flaps. being vertically spaced by a sufficient distance as to prevent their contacting each other.

Preferably, each of said flaps pivot means is defined by a thicknesswise tapering of the inner end of said flaps, said flaps inner ends being integral to the corresponding said inner walls.

Advantageously, said flaps are sufficiently flexible to wipe and clean a rounded as well as a flat dip stick.

Profitably, the frame underface is lined with an adhesive strip, effective in adhering to a metal support surface such as an engine block or an engine compartment.

Said wiper is preferably made in one piece from a semirigid plastic material.

BRIEF DESCRIPTION OF THE DRAWINGS

FIG. 1 is a fragmentary perspective view of the front of an automobile with its hood open, as shown in phantom lines, and further showing in full lines the wiper of the invention and the oil level indicator dip stick partially removed from the stick holding tube which communicates with the engine crank case;

FIG. 2 is an enlarged perspective view of the dip stick wiper assembly, with a section of the oil level indicator engaged therein;

FIG. 3 is a front elevational view of the dip stick wiper assembly;

FIG. 4 is a top plan view thereof;

FIG. 5 is a cross-sectional view thereof;

FIG. 6 is a rear elevational view thereof; and

FIG. 7 1s an enlarged fragmentary view of FIG. 3, suggesting how the dip stick wiper operates in relation to an oil level indicator dip stick.

DETAILED DESCRIPTION OF THE INVENTION

A motorist needs to periodically verify the oil level in the crankcase of the engine 10 of his automobile 12. This is usually done by first opening the hood 13 and withdrawing the oil level indicator dip stick (which is an elongated stem) 14 from an elongated upright tubular extension 16 being integrally mounted to the lower crankcase (not illustrated). A lower section of dip stick 14, which is calibrated, may bear an oil trace, revealing that some oil remains in the crankcase, but an exact measurement is not possible because the movement of the automobile between two read.outs of the oil traces on the dip stick 14 will have shaken the oil 1n the crankcase and thus will have introduced a margin of error in the visual read-out or inspection of the oil film trace. This is why the oil trace must be wiped out from the dip stick 14, the dip stick must be reintroduced a second time in tube 16 down to its lower limit position, and again withdrawn therefrom. At this last step, the trace of oil appearing on the scale of dip stick 14 ("full", "safe" or "add" indications) will be truthful of the exact amount of oil remaining in the crankcase.

Usually, this oil removal from the dip stick 14 requires a fabric sheet or the like, and is a messy operation.

The present invention attempts to efficiently correct this efficiency. A wiping means 18 is provided for the oil level dip stick 14, which is anchored at any convenient position within the engine compartment, preferably near the top outlet of the oil tube 16. Dip stick 14 may have a variety of cross-sectional shapes, such as circular, or thinly rectangular as suggested in the drawings. Wiping means 18 includes a rectangular plate 20 having opposite rounded end sections 20a, 20b, each section being bored at 22. The rear face of plate 20 may include a rectangular pressure-adhesive strip 24, glued thereto and extending short of end sections 20a, 20b. Plate 20 is anchored in horizontal position either by using strip 24 or by metal screw receiving bores 22. Both strip 24 and metal scews can be used.

A cross-sectionally semi-circular block 26 is integrally mounted to the front face of plate 20 in register with strip 24. Plate 20 and block 26 may be hollow, as suggested in FIGS. 4 and 5, for easier molding. A thicknesswise central cross-sectionally square cavity 28 is made in block 26, defining two opposite side walls 30a, 30b. A first pair of upper and lower parallel flaps 32, 34 are edgewisely anchored to wall 30a, at right angle to both wall 30a and plate 20, and a second pair of upper and lower parallel flaps 36, 38 are edgewisely anchored to wall 30b, at right angles to both wall 30b and plate 20. Flap 32 is slightly vertically offset with respect to flap 36, and similarly, flap 34 is slightly offset relative to flap 38. The free ends 42 of flaps 32-38 are substantially in vertical register; and the inner end of each flap is tapered i.e. weakened, at 40, whereby the flaps are pivotable thereabout. One of the two corner edges of each free end 42 of flaps 32-38 is bevelled, at 42a.

The entire wiper is molded in one piece from a semi-rigid plastic and preferably elastomeric material.

It can now be understood that cavity 28 defines a vertical channel, that flaps 32 and 36 define a first pair of swingable doors, and that flaps 34 and 38 define a second pair of swingable doors, wherein dip stick 14 may be slidingly engaged through the vertical channel 28 while biasing the two doors 32, 36 and 34, 38 in partially open position. Because of the resiliency of flaps 32-38, they will exert a scraping biasing force against the surface of dip stick 14, capable of "wiping" out the oil film deposited on the surface thereof. Bevels 42 of the flaps will provide a more stable and thus more effective inclined position of the flaps whenever the dip stick 14 is displaced inwardly or outwardly across the wiper. Bevels 42 are especially useful for a flat and thin cross-sectionally rectangular dip stick 14, such as the one illustrated in FIG. 2, in that they will provide a thorough wiping of the oil film on the dip stick.

Oil is not absorbed by the flaps and therefore the latter will remain clean after each wiping operation. The flaps are flexible enough to curve around a rounded dip stick.

I claim:

1. A wiper member for use in removing a liquid film deposited on a dip stick, comprising: a small, rigid, relatively thick frame adapted to be anchored by a support surface, a cavity being made thicknesswisely of said frame along a vertical axis to define a vertical channel, said cavity being bounded by two side walls and by an inner wall of the wiper member frame wherein said dip stick can be moved through said channel in a direction generally parallel to said inner wall, at least one pair of semi-flexible flaps, edgewisely mounted at their inner ends to said opposite side walls respectively, said flaps being freely maintained in a position orthogonal to said side walls and to said inner wall, pivot means about said inner ends of the flaps to enable said flaps to pivot about horizontal axes thereabout when a transverse biasing force is applied thereto, there being no free horizontal interface between said flaps in their freely maintained position; the free end sections of said flaps being adapted to wipe the surface of said dip stick during dip stick movement through said channel, in order to remove a liquid film deposited thereon.

2. A wiper member as defined in claim 1,
wherein the length of each of said flaps is about half that of vertical register.

3. A wiper member as defined in claim 2,
wherein said pair of flaps are slightly vertically offset, whereby the lower face of the upper flap being coplanar with the upper face of the lower flap of each one of at least one pair of flaps.

4. A wiper member as defined in claim 3,
wherein for each pair of said at least one pair of flaps, the lower corner of said free end section of said upper flap is bevelled and the upper corner of said free end section of said lower flap is also bevelled, to facilitate sliding displacement of said dip stick through said channel.

5. A wiper member as defined in claim 4,
wherein there are two pairs of identical flaps, being vertically spaced by a sufficient distance as to prevent their contacting each other.

6. A wiper member as defined in claim 1,
wherein each of said flaps pivot means is defined by a thicknesswise tapering of the inner end of said flaps, said flaps inner ends being integral to the corresponding said inner walls.

7. A wiper member as defined in claim 1,
further including an adhesive strip, fixed to said rigid frame and effective in adhering to a support surface.

* * * * *